(12) United States Patent
Maruoka (10) Patent No.: US 7,011,127 B2
(45) Date of Patent: Mar. 14, 2006

(54) TIRE FOR HEAVY LOAD USE

(75) Inventor: Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/013,478

(22) Filed: Dec. 17, 2004

(65) Prior Publication Data

US 2005/0133139 A1    Jun. 23, 2005

(30) Foreign Application Priority Data

Dec. 22, 2003 (JP) ............................. 2003-425303

(51) Int. Cl.
*B60C 15/00* (2006.01)

(52) U.S. Cl. ...................................... 152/543; 152/552
(58) Field of Classification Search ................ 152/543, 152/552

See application file for complete search history.

(56) References Cited

U.S. PATENT DOCUMENTS

2005/0006018 A1 * 1/2005 Maruoka et al. ........ 152/552 X

FOREIGN PATENT DOCUMENTS

| JP | 11-321244 A | 11/1999 |
|---|---|---|
| JP | 2000-219016 A | 8/2000 |

\* cited by examiner

*Primary Examiner*—Adrienne C. Johnstone
(74) *Attorney, Agent, or Firm*—Birch Stewart Kolasch & Birch (57) ABSTRACT

A tire for heavy load use includes a carcass ply made of steel cords including ply turn-up portions that are turned up around bead cores from inside to outside in a tire axial direction. Each ply turn-up portion includes a turn-up sub-portion that is first turned up around the bead core and that extends in an inclined manner towards the ply main portion at an angle θ, that is less than 90°, with respect to an outer surface of the bead core in the tire radial direction. The steel cords of the turn-up sub-portion include piercing steel cords that pass through the steel cords of the ply main portion. As a result, the durability of the bead portions is improved while achieving a light-weighted structure.

6 Claims, 10 Drawing Sheets

TIRE FOR HEAVY LOAD USE

BACKGROUND OF THE INVENTION

1. Field of the Invention

The present invention relates to a tire for heavy load use capable of improving the durability of bead portions.

2. Description of the Prior Art

Figure 9:
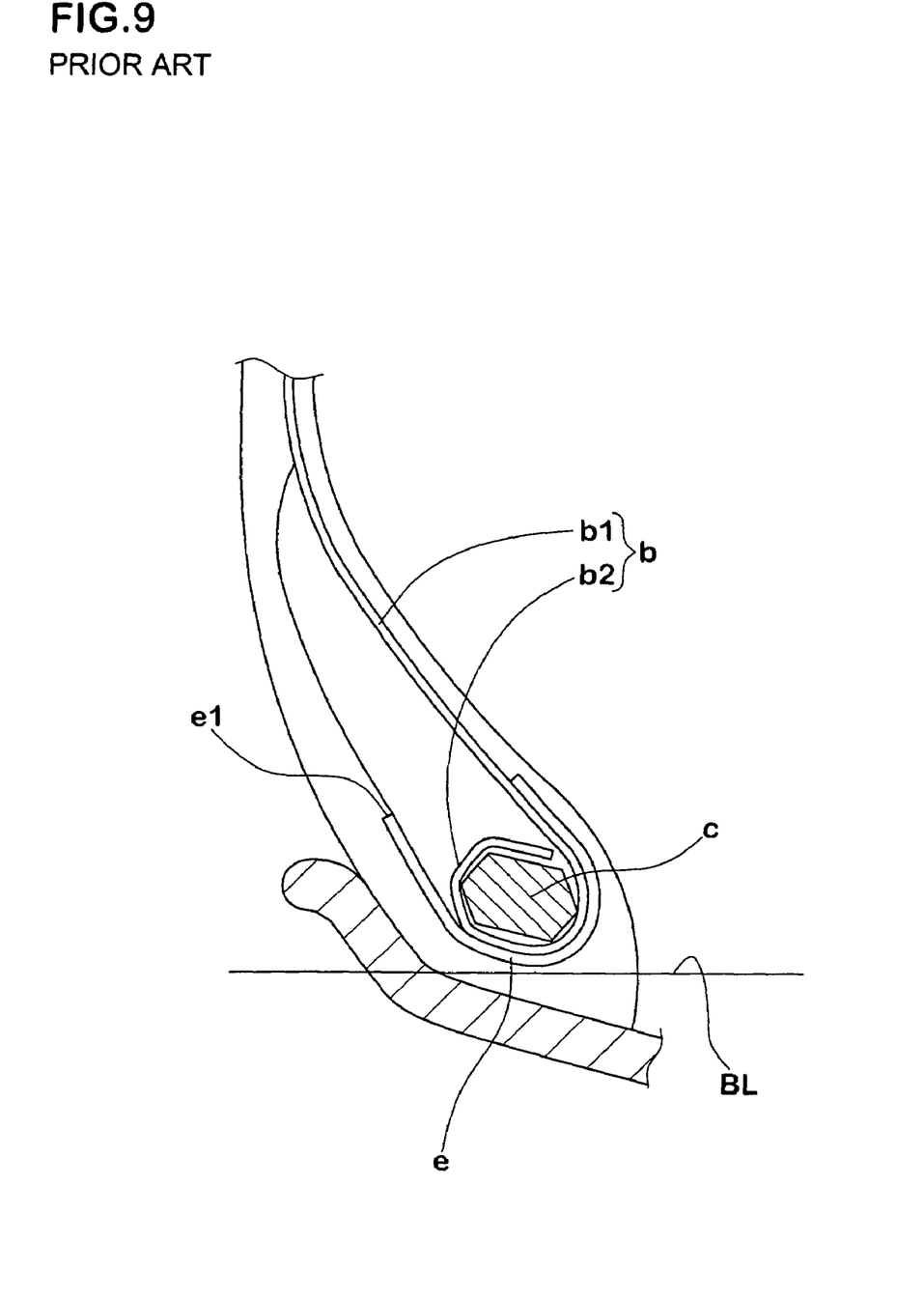
FIG. 9 is a partial sectional view of a bead portion of a conventional tire for heavy load use.

A tire for heavy load use is filled with high air pressure and is used under demanding conditions of largely applied load. Bead portions that bear a large amount of load are thus firmly reinforced, have a large thickness and also have an extremely large weight. For reducing weights of such a tire for heavy load use, it has conventionally been suggested for a tire of bead structure as illustrated in FIG. 9 in which ply turn-up portions b2 that are wound around bead cores c by approximately a full round on both end portions of a main portion b1 of a carcass ply b extending between the bead cores c, c in JP-A 11-321244(1999) and JP-A 2000-219016.

In such a bead structure, outer ends of the turn-up portions b2 are formed to be proximate to peripheries of the bead cores c that are exposed to small strains at the time of performing running under load condition of the tires, so that they are hardly affected through strains during running. Accordingly, damages such as loosing of cords originating at the outer ends of the turn-up portions b2 hardly occur. Moreover, since the length of the turn-up portions b2 of the carcass ply b can be made short, it will also contribute to weight saving of the tire weight.

However, since the above bead structure is arranged in that the turn-up portions b2 are short and in that the degree of bending thereof is large, the bending of the turn-up portions b2 try to return to the original shape in, for instance, the course of raw tire forming. As a result, air holes are apt to be formed between the turn-up portions and the bead core c so that deficient moldings such as air residues are apt to occur. Such deficient moldings present disadvantages in that engaging force proximate of the bead cores 5 of the carcass 6 is reduced so as to induce blow-by phenomena.

SUMMARY OF THE INVENTION

It is therefore an object of the present invention to provide a tire for heavy load use that is capable of improving binding force between a ply main portion and ply turn-up portions while securing advantages exhibited by the above bead structure, that is capable of restricting blow-by of the carcass, and that is capable of improving the durability of bead portions.

According to an aspect of the present invention, a tire for heavy load use comprises a carcass ply which is made of at least one sheet of steel cords and includes a toroidal-shaped ply main portion extending between a pair of bead cores and ply turn-up portions that continue from the ply main portion and that are turned up around the bead cores from inside to outside in a tire axial direction.

Herein, each ply turn-up portion includes a turn-up main portion, which is bent along an inside surface of the bead core in an tire axial direction, an inner surface thereof in a radial direction and an outside surface thereof in the tire axial direction, and a turn-up sub-portion that continues from the turn-up main portion and that extends to separate from the bead cores.

Herein, the turn-up sub-portion extends in an inclined manner with respect to the ply main portion at an angle θ, that is less than 90°, with respect to an outer surface of the bead core in the tire radial direction.

Herein, steel cords of the turn-up sub-portion includes piercing steel cords that pass through the steel cords of the ply main portion.

The tire for heavy load use of the present invention is arranged in that each turn-up sub-portion of the carcass ply terminates in a peripheral region of the bead cores that are exposed to small strains at the time of performing running under load conditions of the tire, thereby being hardly affected through strains during running. Moreover, the steel cords of the turn-up sub-portion include piercing steel cords that pass through the steel cords of the ply main portion. Since movements of the piercing steel cords are restricted between the steel cords of the ply main portion, it is possible to prevent blow-by of the carcass.

DESCRIPTION OF THE PREFERRED EMBODIMENTS

One embodiment of the present invention will now be explained with reference to the accompanying drawings.

Figure 1:
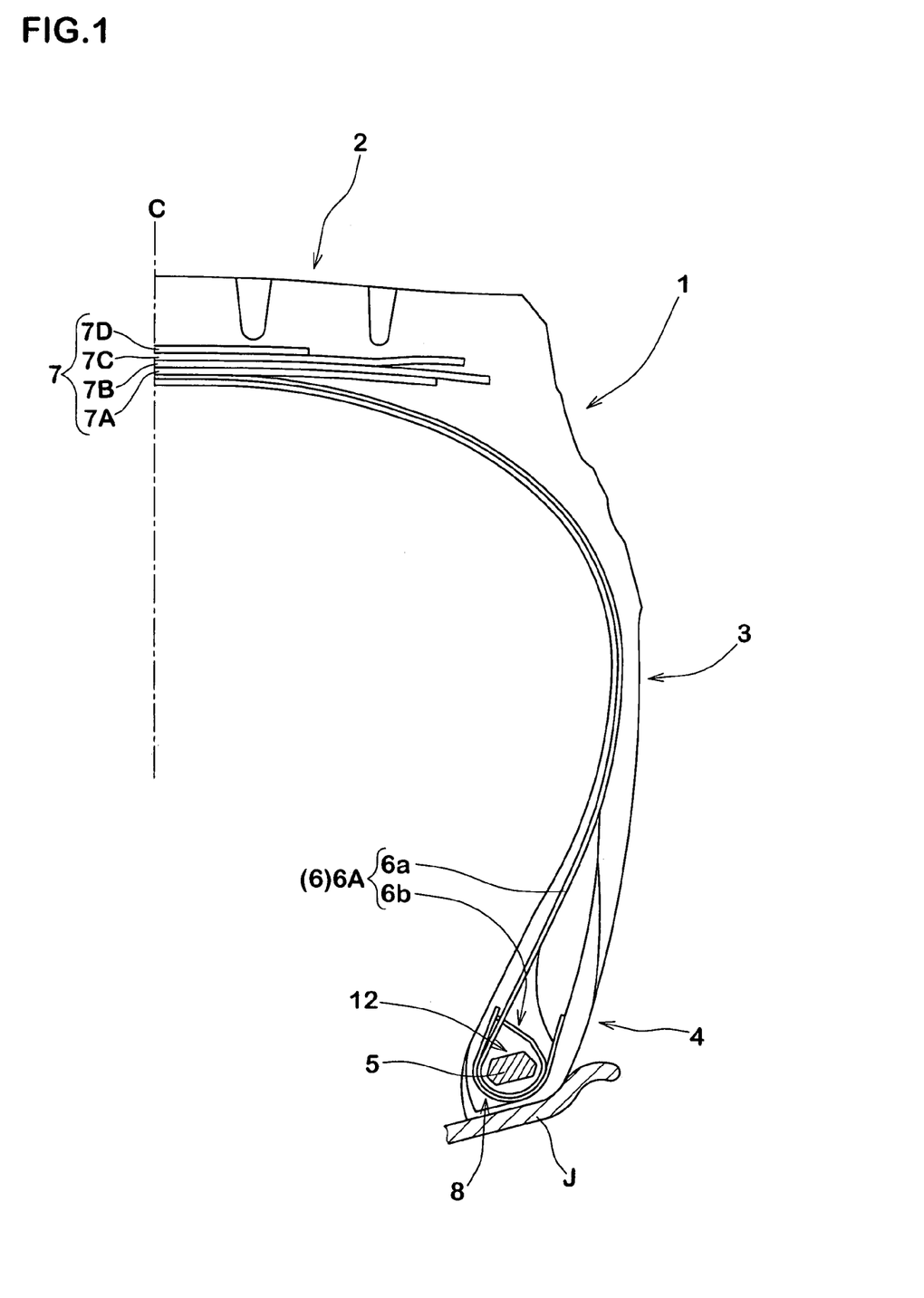
FIG. 1 is a sectional view of a right-hand side illustrating one embodiment of a tire for heavy load use according to the present invention.
Figure 2:
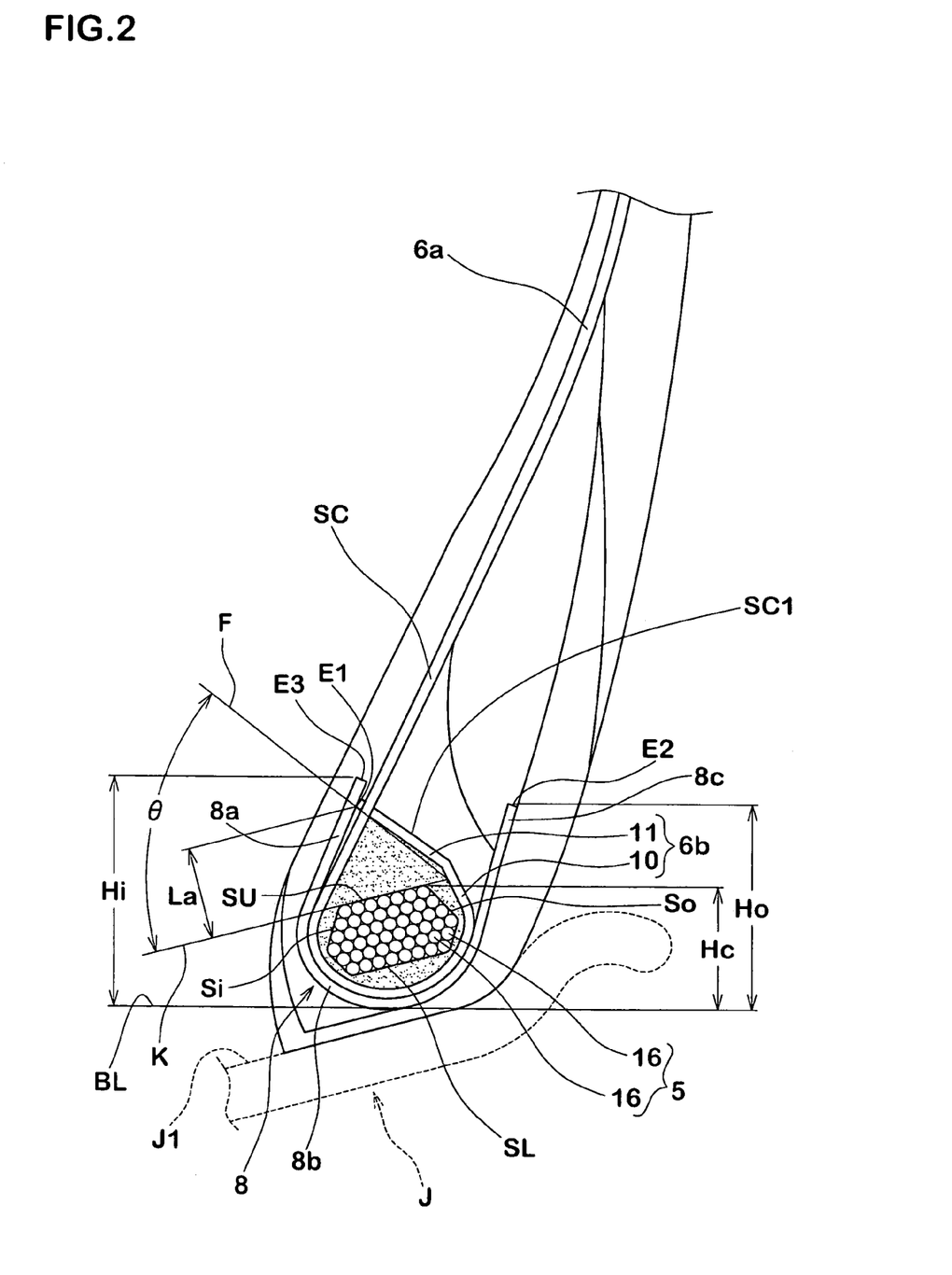
FIG. 2 is a partial enlarged sectional view illustrating a bead portion thereof in an enlarged manner.

FIG. 1 is a sectional view illustrating a natural condition of the tire for heavy load use according to the present invention, and FIG. 2 is a partial enlarged sectional view illustrating a bead portion thereof in an enlarged manner.

Here, a "natural condition" is a condition without load being applied thereto in which a tire is assembled to a regular rim J and is filled with an internal pressure of 50 kPa. In this specification, the term "regular rim" denotes a rim with standards being defined for each tire within standardizing systems including standards on which the tires are based, such concretely being an ordinary rim according to JATMA, a "design rim" according to TRA and a "measuring rim" according to ETRTO. The regular rim J of this embodiment is a 15° drop center rim (so-called 15° tapered rim) according to JATMA.

The reason for setting the internal pressure to 50 Pka is for uniquely defining a natural posture for the tire 1 for heavy load use. Unless otherwise noticed, dimensions of the respective parts are deemed to be those as measured under such natural conditions. This embodiment illustrates a case in which the tire 1 for heavy load use is a tubeless tire.

The tire 1 for heavy load use comprises a carcass 6 that extends from a tread portion 2 over a sidewall portion 3 up to bead cores 5 of bead portions 4, and a belt layer 7 that is disposed outside of the carcass 6 in the radial direction in the tread portion 2.

The carcass 6 is configured by at least one sheet of (one in this embodiment) carcass ply 6A in which carcass cords including steel cords SC (illustrated in FIG. 2) are aligned at an angle of 80 to 90° (substantially 90° in this embodiment) with respect to the tire equator. The number of carcass plies is not particularly limited to one. Detailed descriptions of the turn-up structure of the carcass ply 6A will be made later.

Figure 3:
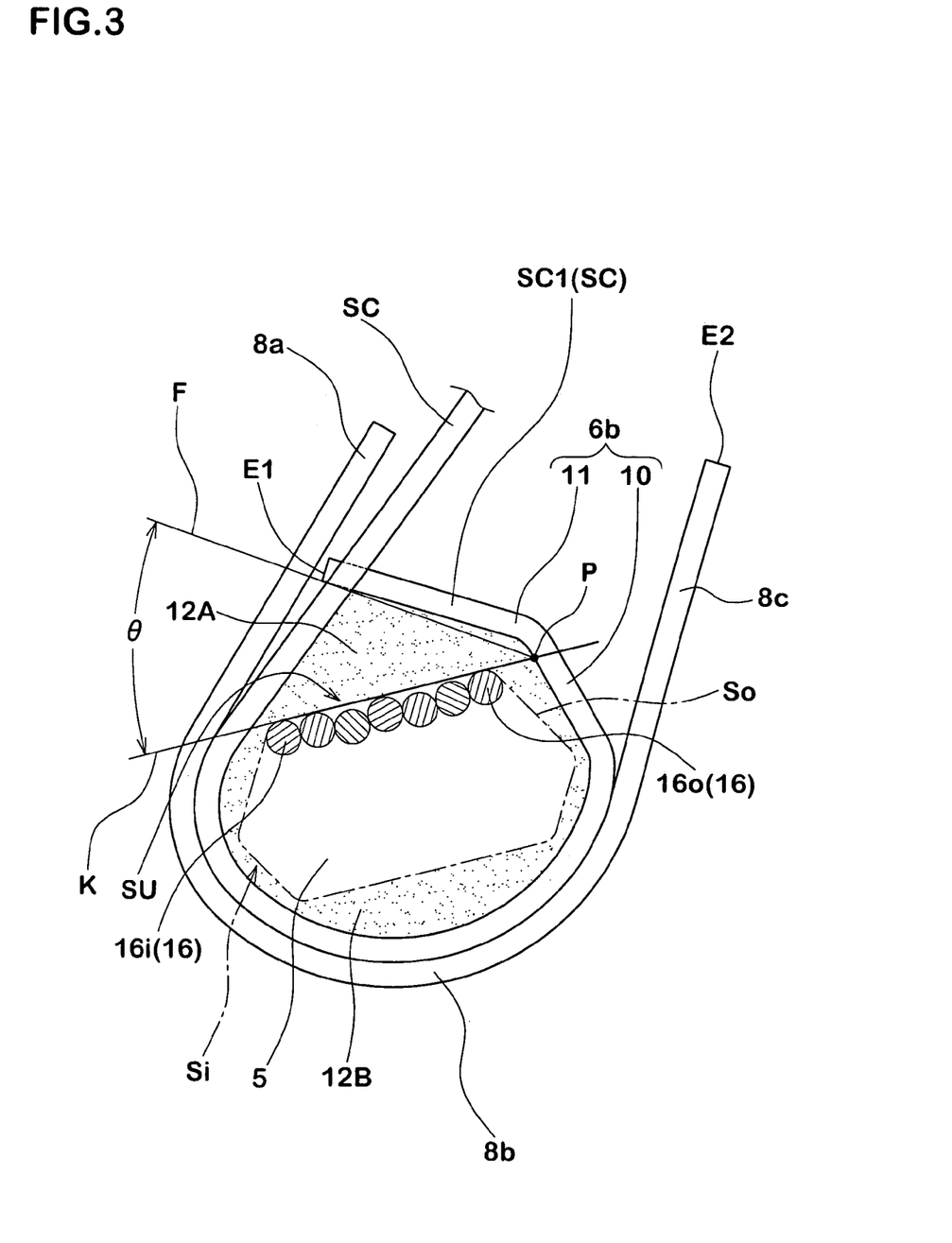
FIG. 3 is a schematic sectional view illustrating the bead portion in a further enlarged manner.

As illustrated in FIGS. 2 and 3 in an enlarged manner, each bead core 5 is formed in a ring-like body in which bead wires 16 made of steel (steel wires having circular sections are used in this embodiment) are wound and bundled in a multi-staged and multi-seriated manner in this embodiment. While not particularly limited, the sectional shape of the bead cores 5 is illustrated in this embodiment to be flat hexagonal with an elongated section. As for the bead core 5 having a substantially hexagonal section, at the cross-section thereof, a surface that forms a longer side inside in the tire radial direction is defined to be an inner surface SL of the bead core 5 in the tire radial direction while a surface that forms a longer side outside in the tire radial direction is defined to be an outer surface SU of the bead core 5 in the tire radial direction. A surface that forms a polygonal flexed surface in which the inner surface SL and the outer surface SU of the bead core 5 are connected inside in the tire axial direction is defined to be the inside surface Si of the bead core in the tire axial direction while a surface that forms a flexed surface outside in the tire axial direction is defined to be the outside surface So in the tire axial direction.

At the cross-section of the bead core 5, the inner surface SL extends approximately in parallel with a sheet surface of a rim sheet J1 of the regular rim J. This serves to improve the fitting force between the bead portion 4 and the rim sheet J1 over a wide range. As mentioned above, the regular rim J is a 15° drop center rim for use in a tubeless tire. Accordingly, both of the inner surface SL and the outer surface SU of the bead core 5 incline with respect to an axial directional line of the tire at an angle of approximately 15°. The reason of mentioning "approximately" is that manufacturing errors are to be considered, wherein errors of ±2° from the above angle are permitted. The sectional shape of the bead core 5 may be orthohexagonal, rectangular or circular if necessary. When the section of the bead core 5 is circular, it is possible to virtually define a square or a rectangle which sides surrounding the bead core face along the tire axial direction, and the inner surface SL, the outer surface SU, the inside surface So and the outside surface Si can be allotted within regions that are sectioned by diagonal lines thereof.

The belt layer 7 is configured by at least two, preferably not less than three, more preferably (as in this embodiment) four, belt plies 7A to 7D. Steel cords are employed as belt cords of each of the belt plies 7A to 7D. In the first belt ply 7A disposed on an innermost side in the tire radial direction, the belt cords are aligned at an angle of, for instance, 60±15° with respect to the tire equator C. In the second to fourth belt plies 7B to 7D that are sequentially disposed outside thereof, belt cords are aligned at a small angle of, for instance, 10 to 35° with respect to the tire equator C. The first to fourth belt plies 7A to 7D are superposed such that belt cords mutually intersect between plies at more than one spot.

The carcass ply 6A is formed of a toroidal-shaped ply main portion 6a extending between a pair of bead cores 5, 5 (while only a bead core on one side is illustrated in the figure) and ply turn-up portions 6b that continue from both sides of thereof and that are turned up from inside to outside in the tire axial direction around the bead cores 5.

As illustrated in FIGS. 2 and 3 in an enlarged manner, each ply turn-up portion 6b is configured by a turn-up main portion 10, which is bent along the inside surface Si of the bead core 5 in the tire axial direction, the inner surface SL thereof in the tire radial direction and the outside surface So thereof in the tire axial direction, and a turn-up sub-portion 11 that continues from the turn-up main portion 10 and that extends to separate from the bead core 5. The turn-up main portion 10 of this embodiment is illustrated such that it faces along the inside surface Si of the bead core 5, the inner surface SL in the tire radial direction and the outside surface So in the tire axial direction as a smooth warped shape.

The turn-up sub-portion 11 extends in an inclined manner towards the ply main portion 6a at an angle θ, that is less than 90°, with respect to the outer surface SU of the bead core 5 in the tire radial direction. As illustrated in FIG. 3 in an enlarged manner, the turn-up sub-portion 11 is a portion further outside in the radial direction than the outer surface SU of the bead core 5 in the tire radial direction (or an extension thereof). The reason for defining the angle θ to be less than 90° is that an outer end E1 of the turn-up sub-portion 11 (corresponding to the outer ends of the steel cords of the turn-up sub-portion 11, and the same applies hereinafter) is apt to approach a region in which strains at the time of running is large when the angle θ becomes not less than 90°. More preferably, the angle θ is not more than 75°. While there is no particular lower limit for the angle θ, it is desirably not less than 30°, more preferably not less than 60°, in view of restricting spring-back at the time of molding.

While the turn-up sub-portion 11 according to this embodiment is illustrated to be of flexed type bending over in a shape of an inverted V shape, it may also be straight linear or smoothly curved. When the turn-up sub-portion 11 has a flexed (or curved) shape as in this embodiment, the angle θ of the steel cords SC of the turn-up sub-portion 11 is defined to be an angle that is formed between a straight line F, which connects a lower end P of the turn-up sub-portion 11 that is orthogonal to the outer surface SU of the bead core 5 in the radial direction or an extension thereof and the outer end E1 of the turn-up sub-portion 11, and the outer surface SU of the bead core 5 in the tire radial direction.

As illustrated in FIG. 3 in an enlarged manner, the bead core 5 is arranged by winding bead wires 16 with circular sections, the sectional shape of the outer surface SU in the tire radial direction will have a contour in which semi-arcs are connected in the tire axial direction. Accordingly, for measuring a relative distance from the outer surface SU or an angle with respect to the outer surface, a tangential line K drawn in the outer surface SU is used as a reference. As illustrated in FIG. 3 in an exaggerated manner, when the bead wires 16 are not uniform in a straight-linear manner but are spread within and outside in the tire radial direction, it will be impossible to draw a single tangential line on the outer surface SU of the bead core 5 in the tire radial direction. In this case, the tangential line K is approximated by a tangential line that contacts a bead wire 16o that is located on the outermost side in the tire axial direction and a bead wire 16i that is located on the innermost side in the tire axial direction from among bead wire strings forming the outer surface SU of the bead core 5 in the tire radial direction.

As illustrated in FIG. 2, the turn-up sub-portion 11 is arranged in that a shortest distance La from the outer end E1 thereof to the outer surface SU of the bead core 5 in the tire radial direction is set to be 5 to 12 mm. When the shortest distance La is less than 5 mm, spring-back of the turn-up sub-portion 11 with respect to the turn-up main portion 10 is apt to occur. There thus will be tendencies that the moldability of raw covers is degraded or that dead air spaces are formed between the turn-up sub-portion 11 and the outer surface SU of the bead core 5 during vulcanization. On the other hand, when the minimum length La exceeds 12 mm, stress at the time of deformation of the tire will strongly act on the outer end E1 of the turn-up sub-portion 11, and damages such as loosing of cords originating at the outer end E1 are apt to occur. It is particularly preferable that the shortest distance La is in the range of 7 to 12 mm.

Figure 4:
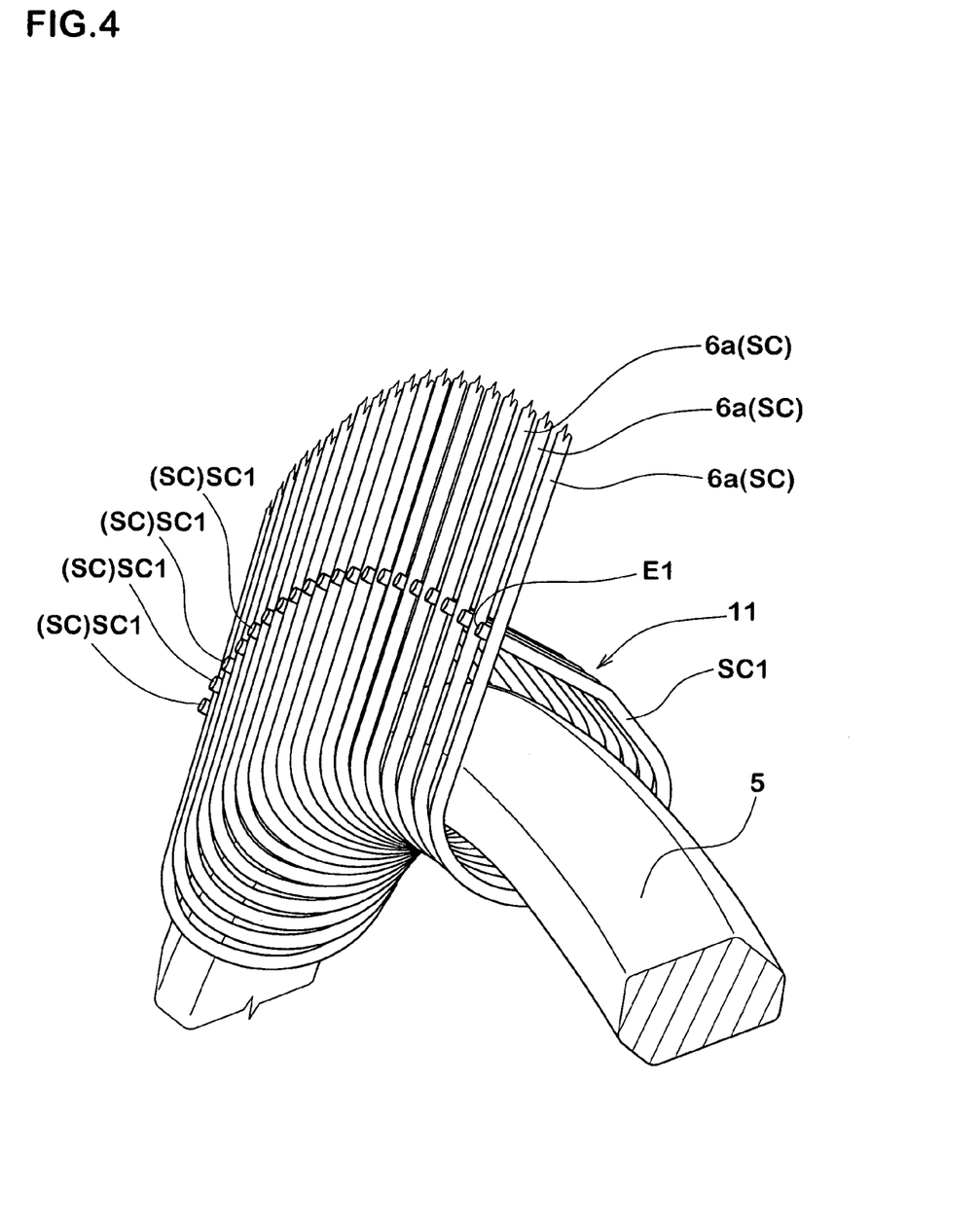
FIG. 4 is a perspective view illustrating a relationship between steel cords of a carcass ply and bead cores proximate of a ply turn-up portion.
Figure 5:
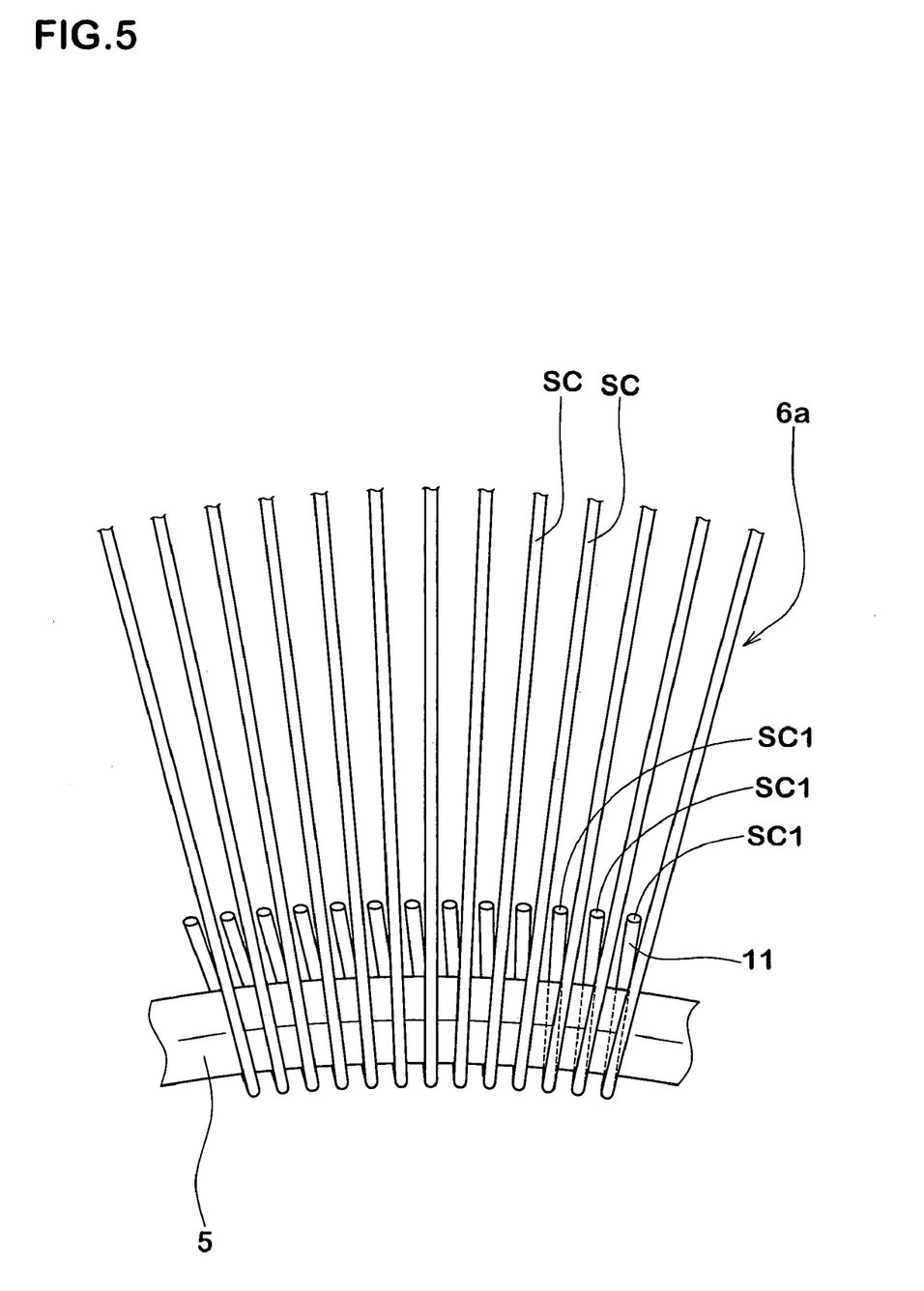
FIG. 5 is a side view illustrating a relationship between the steel cords of the carcass ply and the bead cores proximate of the ply turn-up portion seen from a tire cavity side.

The steel cords aligned at the turn-up sub-portion 11 include piercing steel cords SC1 that pass between steel cords SC, SC aligned at the ply main portion 6a as partially illustrated with the rubber material omitted in FIGS. 4 and 5. This embodiment illustrates a case in which all steel cords of the turn-up sub-portion 11 are configured by those piercing steel cords SC1 only.

One piercing steel cord SC1 each passes between one pair of (mutually adjoining) steel cords SC, SC aligned at the ply main portion 6a. In this embodiment, the respective piercing steel cords SC1 are illustrated to pass through the steel cords SC, SC of the ply main portion 6a and also to pierce further to the tire cavity side than the steel cords SC of the ply main portion 6a. In other words, the outer ends of the piercing steel cords SC1 (equivalent to the outer end E1 of the turn-up sub-portion 11) are positioned closer to the tire cavity side than the steel cords SC of the ply main portion 6a. However, it will be suffice if only a part of the piercing steel cords SC1 enters between the steel cords SC, SC of the ply main portion 6a. The piercing steel cords SC1 of course need to be terminated without piercing out from the tire cavity formed by inner liner rubber.

As illustrated in FIG. 5, the piercing steel cords SC1 and the steel cords SC, SC extending in the ply main portion 6a are disposed such that they do not come into contact with each other. Accordingly, a rubber material including topping rubber or similar is filled into small clearances between the steel cords in FIGS. 4 and 5 though not shown. Such rubber eases and absorbs shear force between steel cords and prevents loosing of the cords.

The steel cords SC extending in the ply main portion 6a restrict the piercing steel cords SC1 and make movements thereof in the tire circumferential direction or in the tire radial direction extremely small when performing running under load conditions of the tire. In other words, strains acting on the outer end E1 of the turn-up sub-portion 11 become small and the durability consequently improves. Actions can be achieved in the tire 1 for heavy load use that could not have been achieved in the past in that piercing steel cords SC1 are restricted by the steel cords SC extending in the ply main portion 6a. As a result, high resistivity against so-called blow-by phenomena can be exhibited, and particularly remarkable blow-by resistivity can be obtained in the presence of temperature rises in the interior of the bead accompanying continuous running under load conditions.

Figure 6:
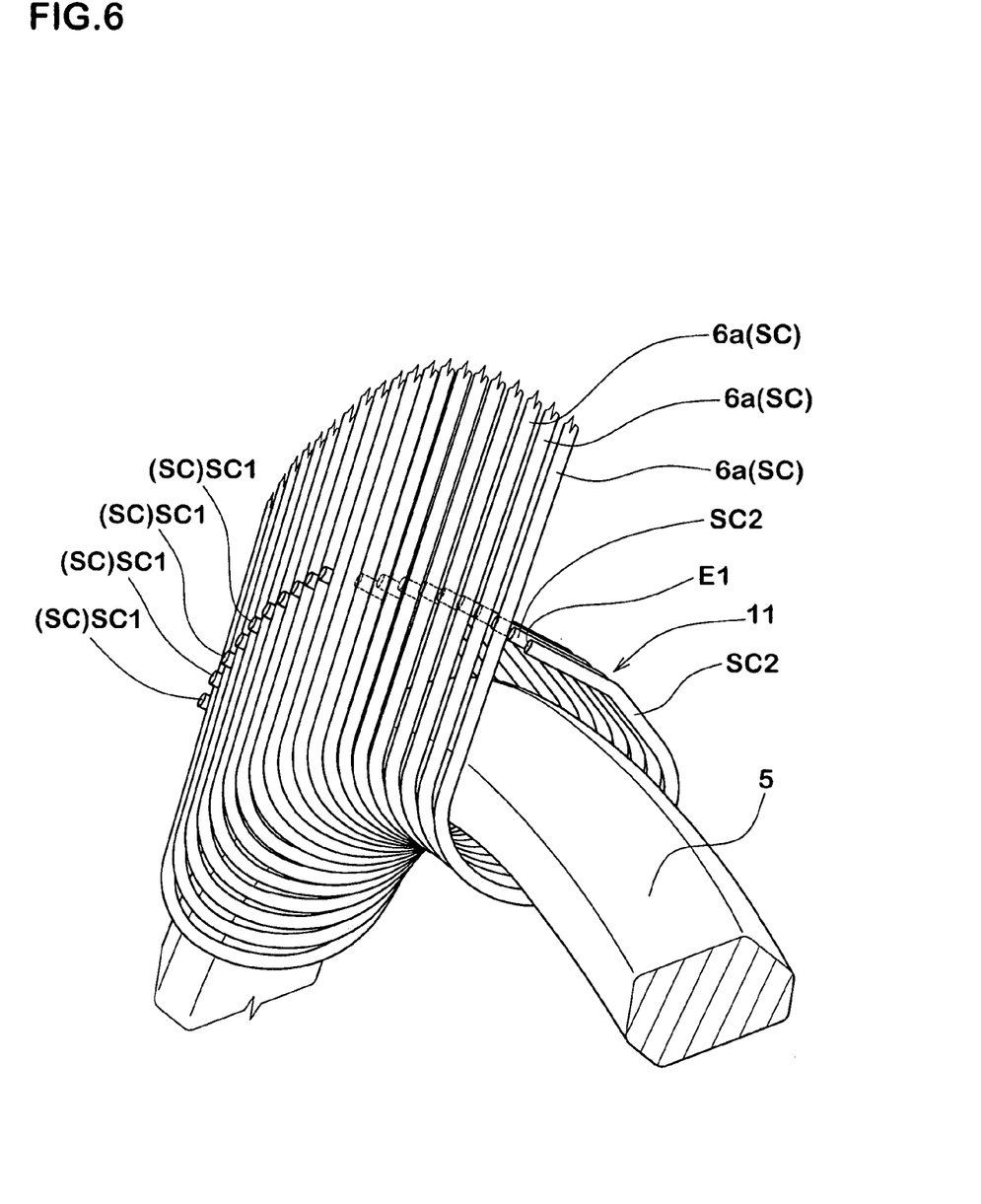
FIG. 6 is a perspective view illustrating another embodiment of the present invention.

In this respect, the turn-up sub-portion 11 is not necessarily configured by the piercing steel cords SC1 only. As illustrated in FIG. 6, which is a schematic view of the cord arrangement proximate of the turn-up portion 6b, the steel cords of the turn-up sub-portion 11 may also include non-piercing steel cords SC2 whose outer ends E1 terminate before reaching to the steel cords SC of the ply main portion 6a. In such a case, the amount of steel cords can be reduced and it will lead to weight saving of the tire weight. On the other hand, when the number of non-piercing steel cords SC2 increases, the restricting force that the turn-up sub-portion 11 can obtain from the ply main portion 6a tends to be degraded. Accordingly, the number of piercing steel cords is preferably set to not less than ⅓, more preferably not less than ½, of the total amount of steel cords of the turn-up sub-portion 11 in at least one of the turn-up sub-portions 11.

Figure 7:
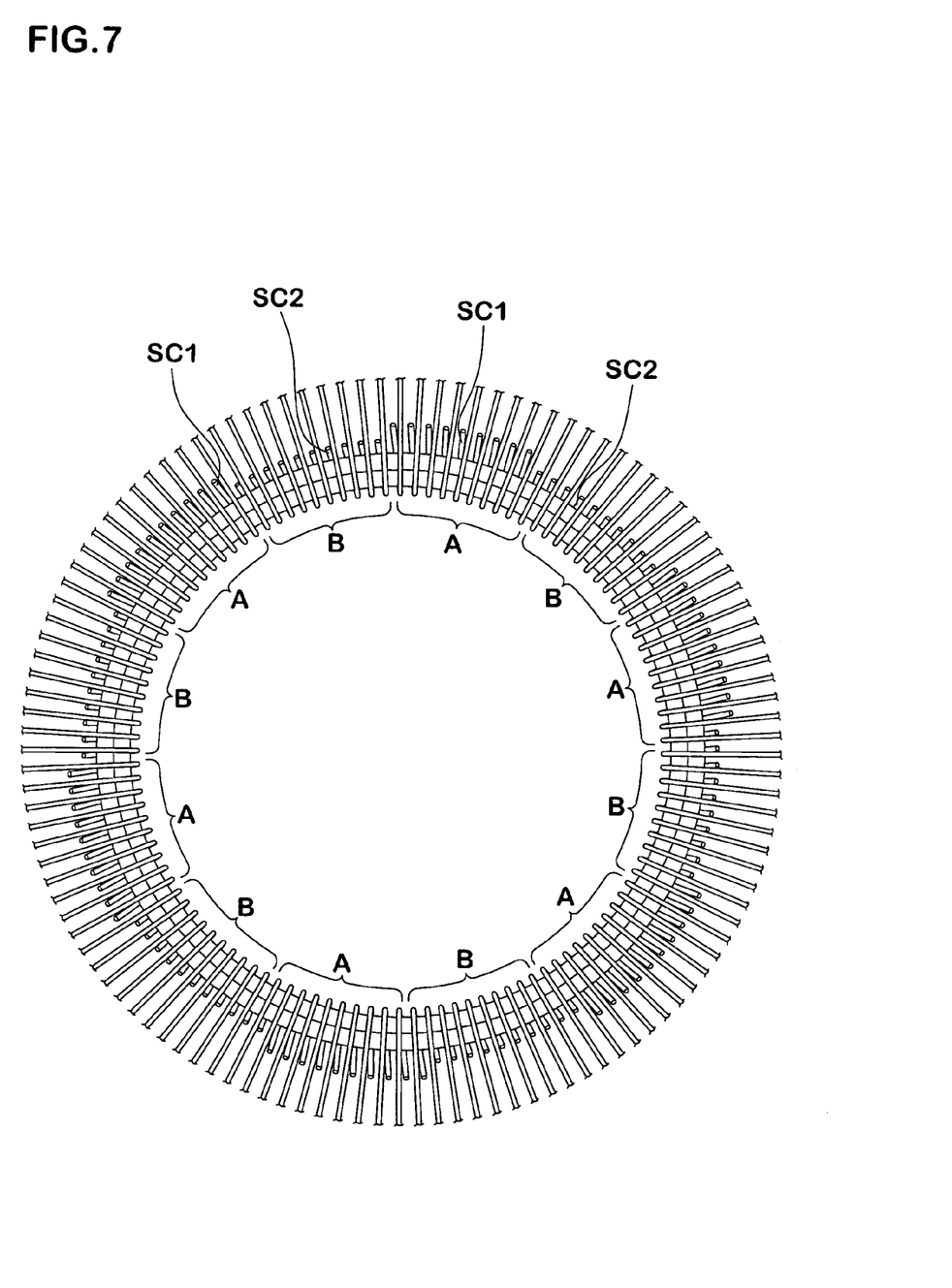
FIG. 7 is a steel cord ordering scheme of a carcass ply illustrating another embodiment of the present invention.

In the case where the piercing steel cords SC1 and the non-piercing steel cords SC2 are intermixed in the turn-up sub-portion 11, it is preferable to dispose a first region A in which the piercing steel cords SC1 are aligned in the tire circumferential direction and a second region B in which the non-piercing steel cords SC2 are aligned in the tire circumferential direction are substantially distributed uniformly in the tire circumferential direction as illustrated, for instance, in FIG. 7 in view of uniformity of the tire.

To make the tire 1 for heavy load use, when building the raw cover, a non-vulcanized carcass ply 6A is turned up around the bead core 5 whereupon the turned up end is strongly abutted to the ply main portion 6a side. With this arrangement, the steel cords of the turn-up sub-portion 11 can be made to pass through the steel cords SC, SC of the ply main portion 6a at the stage of the raw cover. By performing vulcanization molding of the thus obtained raw cover in a conventional manner, it is possible to manufacture the tire 1 for heavy load use. The same effects can be achieved by an alternative manufacturing method by improving profiles of the bladder and/or the mold, such that local pressure is applied such that the ply main portion 6a and the ply turn-up sub-portion 11 are strongly adhered together during vulcanization molding after the raw cover is built in a conventional manner. Various method for manufacturing the tire 1 for heavy load use according to the present invention may be used without being particularly limited.

The structure of the carcass ply 6A of this embodiment is such that the carcass cords of the ply main portion 6a and the carcass cords of piercing portion 11a might come into contact accompanying the collapsing of the ply main portion 6a when it is applied with heavy load. When such a contact of cords continues over a long period of time, it will lead to local damages of the carcass cords due to corrosion. In view of this fact, the bead portion 4 of this embodiment is provided with a bead reinforcing layer 8 including at least one steel cord ply. With this arrangement, damages of carcass cords accompanying the above-described fretting corrosion are more reliably restricted.

The bead reinforcing layer 8 of this embodiment is configured by a single steel cord ply in which, for instance, steel cords are aligned upon inclining the same at an angle of 10 to 40° with respect to a tire circumferential line.

In this embodiment, the bead reinforcing layer 8 is configured by an inner piece portion 8a that extends inside of the ply main portion 6a of the carcass ply 6A, an intermediate piece portion 8b that continues from the inner piece portion 8a and that extends along the turn-up main portion 10, and an outer piece portion 8c that continues from the intermediate piece portion 8b and that extends outside in the tire radial direction. Note that it is sufficient that the bead reinforcing layer 8 includes at least the inner piece portion 8a.

The inner piece portion 8a is disposed further on the tire cavity side than the outer ends E1 of the piercing steel cords SC1. Such an inner piece portion 8a serves as what we call a wall with respect to the outer ends E1 of the piercing steel cords SC1 and restricts large changes in relative positions between the outer ends E1 and the ply main portion 6a. Simultaneously, it is possible to effectively prevent the outer ends E1 of the piercing steel cords SC1 from piercing up to the tire cavity surface including the inner liner. The inner piece portion 8a can further integrate with the ply main portion 6a of the carcass ply 6A when applying load for restricting the amount of collapse to outside in the tire axial direction. With this arrangement, it is possible to reduce strains acting on the outer end E1 of the turn-up sub-portion 11. For obtaining such an action, a height Hi of an outer end E3 of the inner piece portion 8a from the bead base line BL needs at least to be larger than the height of the outer ends E1 of the piercing steel cords SC1.

Basically, the height Hi of the inner piece portion 8a is desirably not less than 100% in relation to a maximum height Hc of the bead core 5 (a height from the bead base line BL to the outermost position of the bead core 5 in the tire radial direction). On the other hand, when the height Hi is too large, the outer end E3 of the inner piece portion 8a might reach a region at which stress is focused at the time of performing running under load conditions. Accordingly, the upper limit value for the height Hi is preferably not more than 300%, more preferably not more than 250%, of the maximum height Hc of the bead core 5.

In this embodiment, it is desirable to interpose an insulation rubber of about 0.5 to 1.5 mm between the cords of the inner piece portion 8a and the outer ends E1 of the piercing steel cords SC1. In this case, it is possible to ease shear force generated between cords and strains at the outer end E3, and it can be expected for further improvements in the durability of the bead portion 4. In this respect, ends e1 at the inner piece portion 8a of the bead reinforcing layer 8 (number of implanted cords per each widths of 5 cm measured in a cord longitudinal direction and an orthogonal direction) is preferably 0.5 to 1.5 times, more preferably 0.6 to 1.0 times, of the ends e2 of the turn-up sub-portion 11. With this arrangement, the inner piece portion 8a can be reliably made to function as a wall with respect to the piercing steel cords SC1.

As mentioned above, the cord angle of the bead reinforcing layer 8 is desirably not less than 10° and not more than 40° with respect to the tire circumferential directional line for reducing collapsing of the ply main portion 6a.

The intermediate piece portion 8b is disposed to contact the turn-up main portion 10 and is firmly pressed between the bead core 5 and the rim sheet J1. Such a intermediate piece portion 8b is particularly desirable for fixing and stabilizing the position of the inner piece portion 8a and thus the position of the bead reinforcing layer 8.

As for the outer piece portion 8c, when the height of its outer end E2 is too small, it will be difficult to improve the flexural rigidity of the bead portion 4, wherein particularly the rigidity of a region at which it contacts the rim flange cannot be sufficiently secured so that it becomes difficult to restrict movements of rubber at the time of heat generation. In view of this fact, the height Ho of the outer end E2 of the outer piece portion 8c in the tire radial direction from the bead base line BL is desirably not less than 100% of the maximum height Hc of the bead core 5. On the other hand, when the height Ho becomes excessively large, the outer end E2 of the outer piece portion 8c will be positioned in a region that is exposed to large strains when performing running under load conditions so that stress tends to be focused thereat. In view of those facts, the height Ho of the outer end E2 is preferably not more than 250%, more preferably not more than 220%, than the maximum height Hc of the bead core 5.

Figure 8:
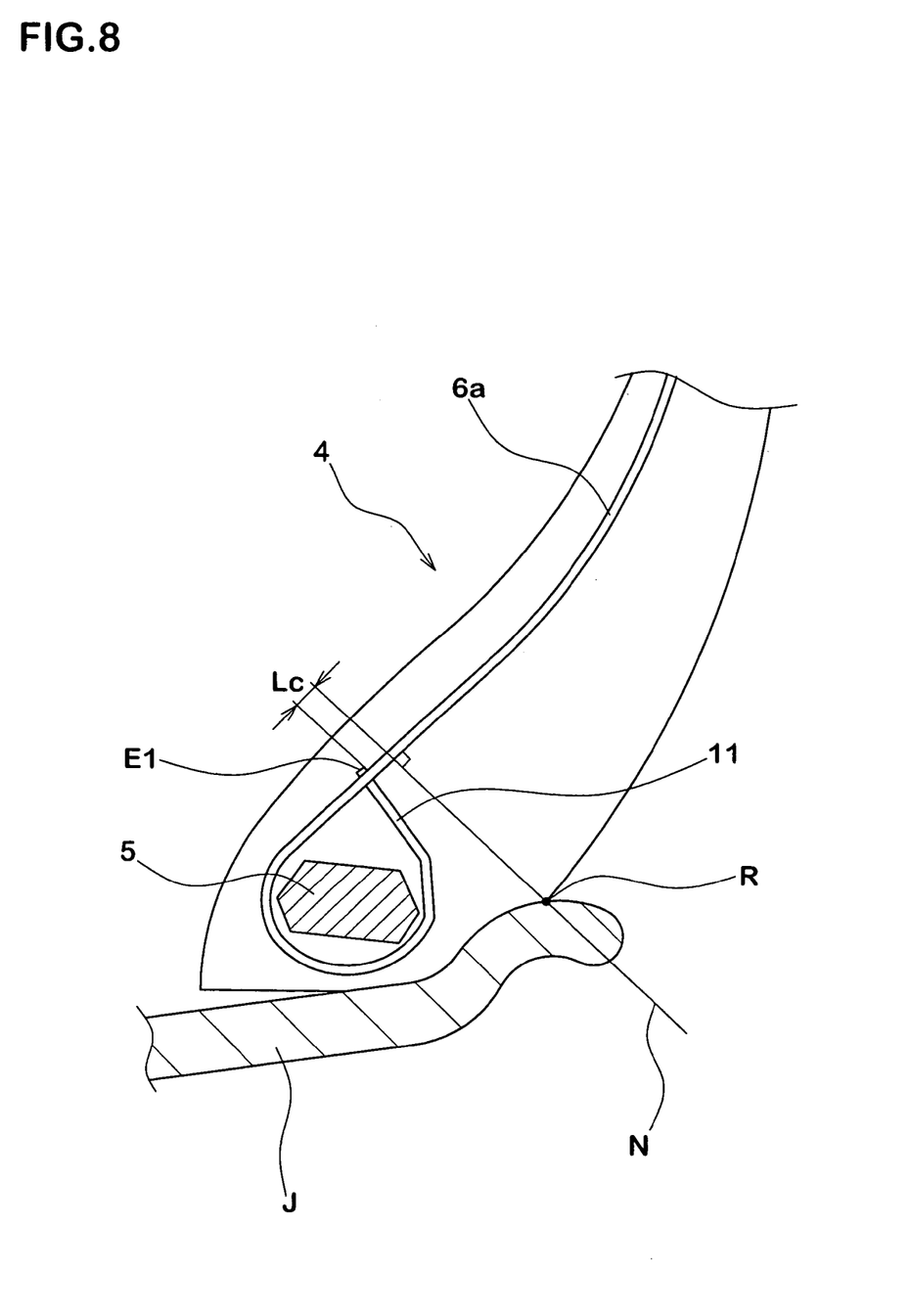
FIG. 8 is a schematic sectional view of a bead portion in a normal condition.

FIG. 8 illustrates a schematic sectional view of the bead portion 4 in a normal condition without being applied with load in which the tire 1 for heavy load use according to this embodiment is assembled to a regular rim J and filled with normal internal pressure.

In the normal condition, the outer ends E1 of the steel cords of the turn-up sub-portion 11 are positioned further inside in the radial direction than a normal line N that passes through a rim seceding point R and that is drawn in the ply main portion 6a. Moreover, a distance Lc of the outer ends E1 from the normal line N along the ply main portion 6a is preferably set to 2 to 12 mm. When the tire is performing running under a load condition, the bead portion 4 flexes and deforms with the rim seceding point R being substantially the fulcrum. By securing a distance Lc of at least 2 mm, strains acting on the outer ends E1 of the steel cords E1 can be reliably reduced. In this respect, where the distance Lc becomes not less than 12 mm, spring-back of the turn-up sub-portion 11 is apt to occur. A particularly preferable distance Lc is thus 5 to 10 mm.

In this respect, a "rim seceding point" is a point at which secession of the outer surface of the bead portion 4 from the regular rim J is started in a normal condition.

The tire for heavy load use 1 is further disposed with filler rubber 12 in a region that is enclosed by the ply main portion 6a of the carcass ply 6A and the ply turn-up portions 6b. As illustrated in FIG. 3, the filler rubber 12 includes a base portion 12A that is disposed in a region having a substantially triangular section surrounded by the outer surface SU of the bead core 5 in the tire radial direction, the turn-up sub-portion 11 and the main portion 6a, and a relatively thin sub-portion 12B having a substantially U-shaped section disposed between the bead core 5 and the turn-up main portion 10. The sub-portion 12B may be omitted if necessary. Such a base portion 12A restricts spring-back of the turn-up sub-portion 11 by restricting the turn-up sub-portion 11 from excessively approaching the bead core 5 at the time of molding and further prevents occurrence of molding deficiencies such as air residues at the time of molding.

The filler rubber 12 is formed of a rubber composition of low elasticity that exhibits shock and stress easing effects and having a complex elastic modulus Ea of 5 to 15 Mpa. With this arrangement, it effectively absorbs strains during running acting on the turn-up sub-portion 11 and prevents occurrence of cord loosing though being of small structure.

When the complex elastic modulus Ea is less than 5 Mpa, the rubber will be excessively soft so that movements of the ply turn-up portions 6b during running will become large. Particularly, the ply turn-up portions 6b are apt to be dragged accompanying the softening of the rubber with an increase in temperature, and blow-by is apt to occur. On the other hand, when the complex elastic modulus Ea exceeds 15 Mpa, the softness will be harmed. As a result, functions of easing strains accompanying the collapsing of the ply main portion 6a at the time of running will be degraded and loosing is apt to occur in, for instance, proximity of the outer end E2 of the outer piece portion 8c of the bead reinforcing layer 8. In view of this fact, the lower limit value for the complex elastic modulus Ea of the filler rubber 12 is preferably set to not less than 6 MPa, more preferably not less than 7 MPa, and the upper limit is preferably not more than 12 MPa, more preferably not more than 10 MPa.

The filler rubber 12 is desirably formed of high sulfur-blended rubber having a blending quantity of sulfur as a vulcanizing agent of not less than 4.0 phr. Rubber blended with sulfur by not less than 4.0 phr will exhibit properties in that thermal softening hardly occurs. On the other hand, when the blending quantity of sulfur exceeds 12 phr, vulcanization is excessively promoted so that burning of rubber is apt to occur. The blending quantity of sulfur is thus preferably in the range of 4.0 to 12 phr, and the lower limit value thereof is preferable not less than 5.0 phr and the upper limit value is more preferably not more than 10 phr. In this respect, a blending quantity of sulfur of a rubber composition used for tire is generally 1.0 to 3.5 phr at most.

In this respect, the complex elastic moduli are values obtained by measuring measurement samples by using a viscoelastic spectrometer manufactured by Iwamoto Seisakusho of type "VES F-3" under conditions of a measuring temperature of 70° C., a frequency of 10 Hz, an initial tensile strain of 10% and a bias amplitude of 1%. The measuring sample used was obtained by scrapping tires and cutting out pieces in question by a size having a width of 4 mm, a length 30 mm and a thickness of 1 to 2 mm and by smoothing the concaves and convexes on the surface through buffing.

While a particularly preferable embodiment of the present invention has been described in details, the present invention is not to limited to the illustrated embodiment alone but may of course be embodied upon modifying the same into various forms.

EXAMPLES

Figure 10:
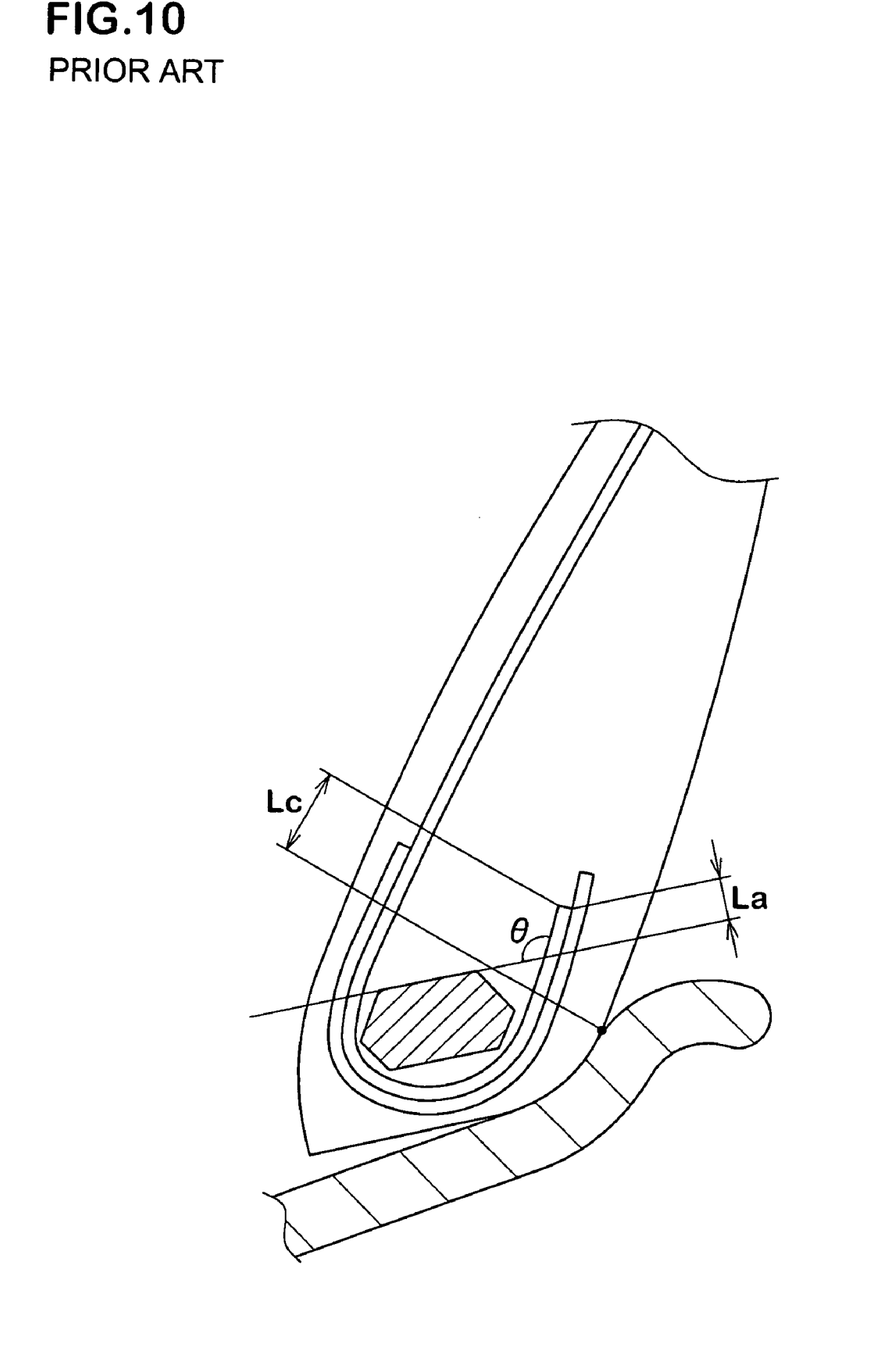
FIG. 10 is a partial sectional view of a bead portion of a tire for heavy load use according to Comparative Example 1.

Tires for heavy load use having a basic structure of FIG. 1 and based on specifications as defined in Table 1 (size: 11R22.5, pattern: four ribs, groove depth: 14 mm, tread width: 230 mm, tread curvature radius: 700 mm) were sampled and measured for bead durability. The same tests were performed using a conventional tire as illustrated in FIG. 10 (Comparative Example 1) and a tire including no piercing steel cords while comprising the basic structure of FIG. 2 (Comparative Example 2) for comparing bead durability. In this respect, specifications not described in the tables were common to all tires, and the test methods were as follows.

<Bead Durability>

A drum tester was employed for making the tires run under conditions for the rim being 7.50×22.5 for the rim, for that of the internal pressure 700 kPa and three times of 27.25 kN for the entire load at a velocity of 30 km/h, and the running times until damages were found at the bead portion were measured. Evaluations are indicated as indices with the running time of the Comparative Example 1 being defined as 100. The larger the value is, the more favorable it is. Test results are shown in Table 1.

TABLE 1

|  | Example | Comparative Example 1 | Comparative Example 2 |
| --- | --- | --- | --- |
| Ratio of piercing steel cords [%] | 50 | 0 | 0 |
| Ratio of non-piercing steel cords [%] | 50 | 100 | 100 |
| Angle θ [deg] | 45 | 115 | 45 |
| Distance La [mm] | 7.0 | 10.0 | 7.0 |
| Distance Lc [mm] | 6.0 | −30.0 | 6.0 |
| Bead durability | 120 | 100 | 0 |
| Figure showing configuration | FIG. 2 | FIG. 10 | Modification of FIG. 2 |

It can be understood from the test results that the tire of the present example exhibits improved durability of the bead portion.

What is claimed is:

1. A tire for heavy load use, comprising a carcass ply which is made of at least one sheet of steel cords and includes a toroidal-shaped ply main portion extending between a pair of bead cores and ply turn-up portions that continue from the ply main portion and that are turned up around the bead cores from inside to outside in a tire axial direction,
   wherein each ply turn-up portion includes a turn-up main portion, which is bent along an inside surface of the bead core in an tire axial direction, an inner surface thereof in a radial direction and an outside surface thereof in the tire axial direction, and a turn-up sub-portion that continues from the turn-up main portion and that extends to separate from the bead cores,
   wherein the turn-up sub-portion extends in an inclined manner with respect to the ply main portion at an angle θ, that is less than 90°, with respect to an outer surface of the bead core in the tire radial direction, and
   wherein steel cords of the turn-up sub-portion includes piercing steel cords that pass through the steel cords of the ply main portion.

2. The tire for heavy load use according to claim 1, wherein the steel cords of the turn-up sub-portion include the piercing steel cords only.

3. The tire for heavy load use according to claim 1, wherein the steel cords of the turn-up sub-portion include non-piercing steel cords which outer ends terminate in front of the ply main portion, and the piercing steel cords, and
   wherein the number of piercing steel cords is not less than ⅓ of the total number of steel cords at least at one of the turn-up sub-portions.

4. The tire for heavy load use according to claim 1, wherein the bead portion has a bead reinforcing layer including steel cords, and
   wherein the bead reinforcing layer includes at least an inner piece portion that extends inside of the ply main portion of the carcass ply in the tire axial direction and that is disposed closer to a tire cavity side than the outer ends of the piercing steel cords.

5. The tire for heavy load use according to claim 1, wherein the turn-up sub-portion is arranged in that a shortest distance from the outer ends of the piercing steel cords to the outer surface of the bead core is 5 to 12 mm.

6. The tire for heavy load use according to claim 1, wherein in a tire meridian section in a normal condition in which no load is applied to the tire that is assembled to a regular rim and that is filled with normal internal pressure, outer ends of piercing steel cords of the turn-up sub-portion are located further inside in the radial direction than a normal line N that passes through a rim seceding point at which an outer surface of the bead portion secedes from the regular rim and that is drawn in the ply main portion, and wherein a distance Lc of the outer ends of the piercing steel cords from the normal line N along the ply main portion is set to 2 to 12 mm.

* * * * *